Patented Nov. 18, 1924.

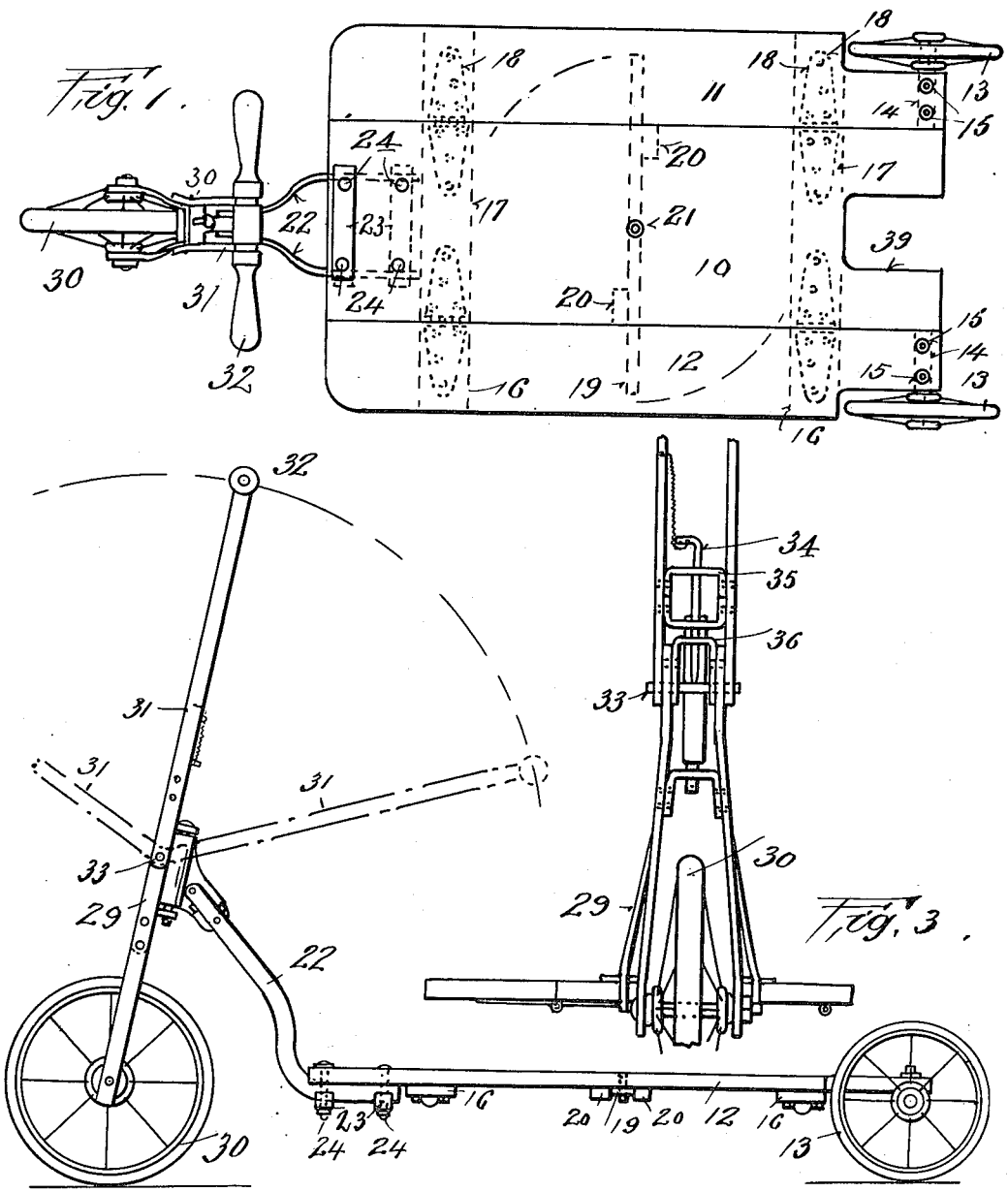

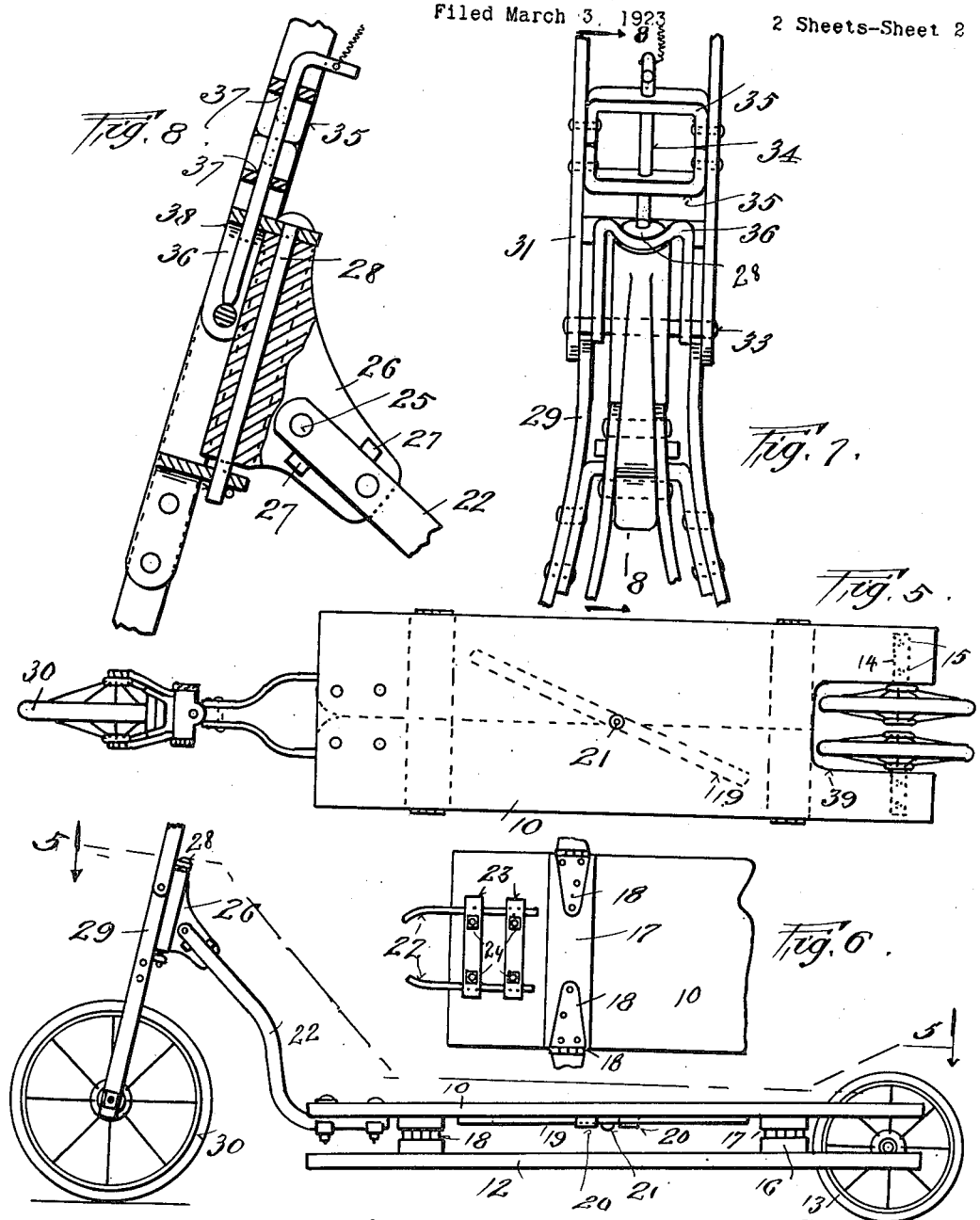

1,516,105

UNITED STATES PATENT OFFICE.

YOKICHI KINOSHITA, OF BOSTON, MASSACHUSETTS.

SCOOTER CART OR JOY RUNNER.

Application filed March 3, 1923. Serial No. 622,493.

*To all whom it may concern:*

Be it known that I, YOKICHI KINOSHITA, a subject of the Emperor of Japan, residing at Boston, county of Suffolk, State of Massachusetts, have made a new and useful invention in Scooter Carts or Joy Runners, of which the following is a specification.

This invention relates to a convertible perambulator or cart which can be readily changed into a wolf runner or scooter as will appear hereinafter.

It is a further object of my invention to provide a healthful exerciser or joy runner which possesses means for effecting the above indicated changes and whereby a child may use his cart as a coaster or as a wagonette, and then by a simple folding movement change the cart construction into the runner or scooter mentioned above. A further object includes the provision of a structure which is light in weight, simple and inexpensive in construction and which is readily converted from one type of toy into the other, as may be desired.

Other objects will appear hereinafter, and I attain these objects by the construction illustrated in the accompanying drawing in which—

Fig. 1 is a plan view of a construction embracing my invention when used in the form of a cart or wagonette;

Fig. 2 is a side elevation thereof;

Fig. 3 is a front elevation showing the steering mechanism;

Fig. 4 is a side view of the device when collapsed and formed into a wolf runner or scooter;

Fig. 5 is a view taken on lines 5—5 of Fig. 4;

Fig. 6 is a bottom view of the front part of the main platform showing the attachment of the supporting bracket;

Fig. 7 is a view of the steering handle and support and

Fig. 8 is a section taken on lines 8—8 of Fig. 7.

Like numerals refer to similar parts throughout the several views.

In the accompanying drawing, I have shown a construction which embodies my invention and the principles thereof, and which is to be taken as illustrative and not in a limiting sense. A main support or platform 10 is provided with foldable right and left side wings 11 and 12 respectively. The side wings are provided with rear wheels 13 which are carried on suitable axle pieces 14. The axle pieces are fastened to the side wings by bolts 15 or their equivalent. Cross pieces 16 on the side wings and corresponding cross pieces 17 on the main platform afford supports for strap hinges 18 whereby the side wings may be collapsed when the stay bar or brace 19 is moved from its extended position against stops 20 to its folded position (Fig. 5) by swinging on its pivot 21.

The forward end of the supporting platform is supplied by a double bracket 22 which is fastened to the platform by cross pieces 23 and bolts 24. To this bracket is secured, by rivets 25, a steering knuckle 26, having securing lugs 27 and a king bolt 28. Fitted onto the steering knuckle is the wheel or steering bracket 29, to the lower end of which is attached the front guide wheel 30, and to the upper end thereof is pivotally attached the guide handle frame 31, which carries the double guide handle 32. The guide handle frame is mounted on a pivot bolt 33 which permits free pivotal movement of the guide handle, when the securing pin 34 is withdrawn from its securing brackets 35 and 36. The securing bracket 35 is conveniently composed of two members both of which are securely riveted on to the guide handle frame 31 and are provided with aligned pin holes 37. The other or complemental securing bracket 36 is secured riveted to the wheel or steering bracket 29 and is also provided with a central bore 38 in line with holes 37 when the steering handle is in a straight line position to receive the securing pin 34. When in the secured position the handle is suited as a guide for the scooter, and when the device is to be used as a coaster or as a cart, pin 34 may be withdrawn, and the handle may then be moved freely on its pivot 33.

From the description herein given, the use and operation of my device is clear. When the side wings are unfolded, as is best shown in Fig. 1, my device is in the form of a wagonette or a cart, and can be so used, or it may be used as a coaster. The guide handle may be held rigidly, or it may be used to swing freely about its pivot as desired.

If it is now desired to transform my wagonette or cart, into a joy runner or scooter, the stay bar is first moved to its folded position. The side wings are then collapsed or folded under into the position indicated in Fig. 4. The two rear wheels will now be positioned closely together in the U-shaped cut 39, and will act as a single wheel for rapid running in the manner well understood. The guide handle is, while in this position, usually, though not necessarily, held rigidly on the securing brackets by the securing pin 34. The device is simple and strong, and its ease of conversion from a toy wagon coaster, to a live scooter or joy runner appeals to the active boy or girl for whose pleasure and health it is designed or invented.

Having now described my invention and illustrated an embodiment thereof, what I claim as new and useful, of my own invention and desire to secure by Letters Patent, is:—

1. A convertible health exerciser in the form of a wagonette or scooter comprising a central platform and collapsible side wings, a guiding wheel attached on a medial line of the central platform and a stabilizing wheel attached to one end of each of the side wings.

2. In a combined wagonette and scooter, a central platform and side wings, a wheel for said platform pivotally attached thereto, and a wheel on each of said side wings, means on said platform for holding said side wings extended to form a wagonette, means for folding the wings against the central platform to form a scooter, and means for guiding said wagonette.

3. In a combined wagonette and joy runner, a central platform and side wings, means on said platform for holding said side wings extended, means for folding said side wings upon the central platform, a guide wheel attached to said platform, a supporting wing wheel axle attached to each of said wings and a wheel on said axle whereby said platform and wings serve as a wagonette or as a joy runner in accordance with the position of the wings and attached wing wheels.

4. In a combined wagonette and joy runner, a central platform provided with a notched portion, collapsible lateral platforms hinged to said central platform, a guide wheel and steering mechanism on said central platform, and a supporting wheel on each of said collapsible platforms, said supporting wheels fitting into said notched portion of the central platform when the lateral platforms are collapsed.

In testimony whereof I have hereunto set my hand on this twenty-eighth day of February, A. D., 1923.

YOKICHI KINOSHITA.